April 22, 1958
A. E. CARLE
2,831,359
BELTING
Filed Feb. 28, 1955
FIG.1.
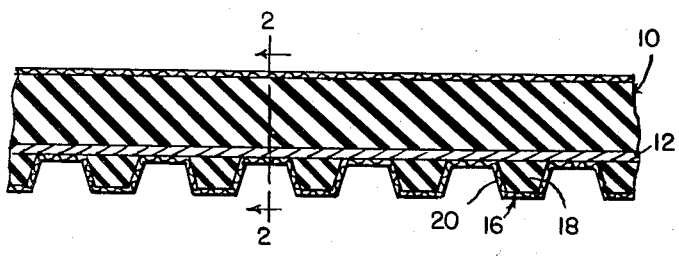
FIG.2.
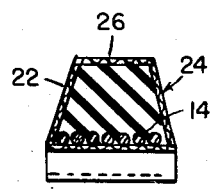
FIG.3. FIG.4.
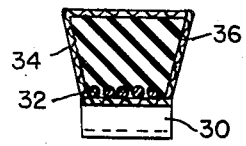 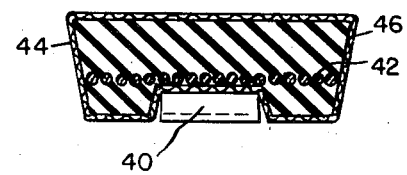
FIG.7.
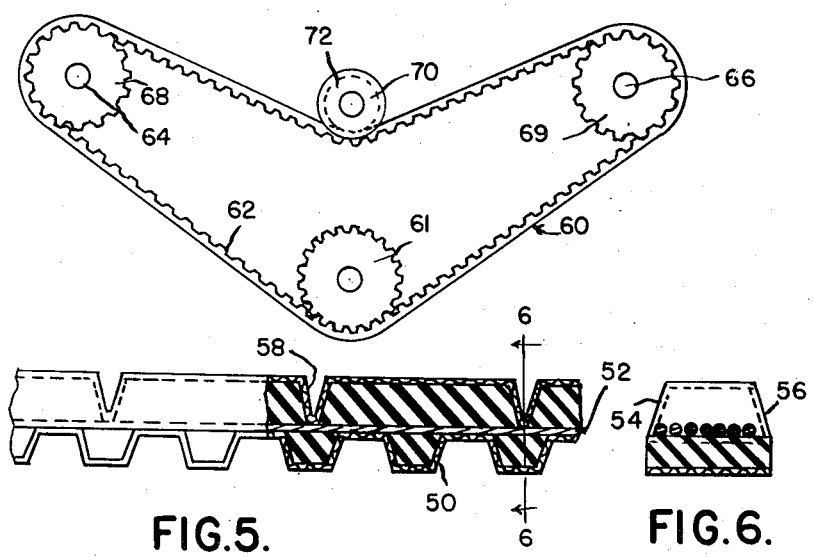
FIG.5. FIG.6.
INVENTOR.
AMOS E. CARLE
BY Whittemore,
Hulbert & Belknap
ATTORNEYS

UNITED STATES PATENT OFFICE 2,831,359
Patented Apr. 22, 1958

2,831,359

BELTING

Amos E. Carle, Detroit, Mich.

Application February 28, 1955, Serial No. 490,885

3 Claims. (Cl. 74—233)

The present invention relates to belting and more particularly to an endless flexible belt having one side provided with teeth of the type normally provided on timing belts, and having its other side shaped in a truncated V-formation.

It is an object of the present invention to provide a flexible timing belt cooperable simultaneously with toothed and V-type pulleys.

More specifically, it is a feature of the present invention to provide a flexible belt having a substantially inextensible strain resisting ply, teeth located at one side of said ply with the dedendums or roots of said teeth located substantially in the plane of said strain resisting ply, the portion of said belt at the opposite side of said ply having angularly related sides defining a truncated V.

Other objects and features of the invention will become apparent as the description proceeds, especially when taken in conjunction with the accompanying drawings, wherein:

Figure 1 is a fragmentary longitudinal section through a belt constructed in accordance with the present invention.

Figure 2 is a section on the line 2—2, Figure 1.

Figure 3 is a view similar to Figure 2 showing a modified construction.

Figure 4 is a view similar to Figure 2 showing yet another modified construction.

Figure 5 is a fragmentary side elevation partly in section showing yet another modification of the present invention.

Figure 6 is a section on the line 6—6, Figure 5.

Figure 7 is an elevational view of a power transmission system employing the improved transmission belt.

In the past, transmission belts for transmitting substantial power have normally been of the V-belt type having outwardly diverging sides adapted to engage wedgingly and correspondingly inclined sides of a V-shaped groove in a pulley. This type of belting is non-positive in character and of course could not be used as a timing belt where an essential requirement is the consistent maintenance of angular relationship between two or more rotatable elements operatively engaged by the belt.

Timing belts have been provided having teeth spaced at a uniform pitch therealong and normally including a substantially inextensible strain resisting element serving to maintain the spacing or pitch of the teeth uniform for coaction with toothed pulleys.

In accordance with the present invention the best features of timing belts and V-belts have been combined in a single unitary belting which is adapted to maintain angular relationship between toothed rotary elements engageable therewith and which at the same time is capable of transmitting substantial loads through the V-belt section thereof.

Referring now to the drawings, Figures 1 and 2 show a portion of an endless transmission belt 10 having a substantially inextensible flat strain resisting member 12. This member may be formed of cords, wires, glass fibers, or any other material adapted to be employed in substantially flat flexible condition, incorporated in the rubber material of the belt and adapted to undergo no significant elongation under the loads for which the belting is designed. In the figures the strain resisting member is illustrated as comprising a plurality of longitudinally extending cords or wires 14. Alternatively, the strain resisting member may be formed of one or more plies of a woven fabric, such for example as a "nylon" or "rayon" fabric.

As illustrated in the figures, teeth 16 are provided and the roots or dedendums are as closely as possible coincident with the plane of the strain resisting member. The dedendum circle of the teeth, in passing over a toothed timing pulley, substantially coincides with the bottom of the spaces between the belt teeth 16, and with the crests of the pulley teeth. The teeth 16 include core or main rubber portions 18 and preferably are coated with wear resisting material such as fabric, as illustrated at 20.

At the opposite side of the strain resisting member 12 the belt 10 is formed of V-section, as best illustrated in Figure 2, having upwardly converging edges 22 and 24. Preferably, the sides 22, 24 and upper side of the V-section of the belt are covered with the protective fabric covering illustrated at 26.

The strain resisting member is in effect embedded in a solid continuous and endless rubber belt formed of a suitable rubber material or compound. In the manufacture of the product on standard molds, additional spacing may be allowed between the windings of wire, cotton thread, fiber glass, or other materials making up the strain resisting member. Thereafter, the rubber materials or compounds are added as an outer covering to the timing belt while the teeth thereof remain in the mold so that the wire, thread or other strain resisting material is embedded in and firmly bonded to both the toothed and V-sections of the belt.

Referring now to Figure 3 there is illustrated a similar arrangement in which the teeth 30 are provided at one side of the strain resisting member 32 and at the opposite side the belt is provided with upwardly diverging sides 34 and 36. The diverging sides 34 and 36 may be employed for example in guiding the belt with reference to a toothed pulley having teeth cooperating with the teeth 30, in which case, tapered pulley side walls on either side of the pulley teeth would frictionally engage the sides 34, 36, respectively.

Referring to Figure 4 there is illustrated another embodiment of the present invention in which the belt is provided with teeth 40 at one side of the strain resisting member 42. The sides 44 and 46 are inclined for coaction with V-type pulleys. In Figure 4 the sides 44 and 46 are shown as diverging upwardly, but they could with equal facility be made to converge upwardly in the manner illustrated in Figure 2. The embodiment illustrated in Figure 4 differs primarily in that the toothed timing belt section is in effect located laterally inwardly from the sides and set inwardly into the V-belt section.

Referring now to Figures 5 and 6 there is illustrated yet another embodiment of the present invention. In this case the timing belt teeth 50 are again located with their roots or dedendums as closely as possible coincident with the strain resisting member 52, the V-belt section having upwardly converging sides 54 and 56 interrupted by V-shaped notches 58 to increase the flexibility of the belt. Tensile strength and wear resistance are preserved by locating the notches 58 opposite the teeth 50, rather than at the spaces between the teeth.

Referring now to Figure 7 there is illustrated a typical use of the present invention in which the combined timing and V-type transmission belt 60 is illustrated as driven by a toothed pulley 61, the belt being provided with the timing teeth 62 on its inner surface. Shafts 64 and 66 are driven in timed relation to the pulley 61 by the toothed pulleys 68 and 69 respectively. The belt 60 operates to drive a third shaft 70 through a V-type pulley 72.

It will be appreciated that the pulley may be reversed so that its teeth are on the outer side, in which case the V-section of the belt may be operated as an ordinary V-belt. It is when this use of the belt is contemplated that the provision of the V-shaped notches 58 is particularly useful. The sections between the notches 58 come into direct end-to-end relation to constitute a substantially continuous belt length as the belt runs around the pulley, such as the V-pulley 72. Continuous frictional side engagement of the belt with the sidewalls of the pulley is the result, with full frictional transmission of power. Furthermore, the belt remains silent in operation despite the notches.

Moreover, in any of the embodiments, the strain bearing or resisting member 12, 32, 42 or 52, located just a trifle outwardly of the dedendum line of the timing belt teeth, is the actual primary transmitter of tension of the belt, whether the V portion of the latter is notched (Figs. 5 and 6) or fully continuous along a straight reach. It can thus be said to define a common force transmitting zone of the timing teeth and of the opposite or frictional driving portion of the belt as commonly engaged with toothed and plain pulley members. There is thus no effect of counter-opposition or "fighting" of two different, laterally spaced zones, as is the case in known types of dual section belt construction. There is, it follows, no resultant rapid deterioration due to internal fatigue, such as is common in the operation of the known dual belt forms, toothed or frictional.

The new belt combines the advantages of both the V and timing belts and thus makes possible for the first time many drives heretofore impossible because of mechanical difficulties or because they were not economical.

The drawings and the foregoing specification constitute a description of the improved belting in such full, clear, concise and exact terms as to enable any person skilled in the art to practice the invention, the scope of which is indicated by the appended claims.

What I claim as my invention is:

1. A combined timing and V-type transmission belt, comprising an endless flexible strain member adapted to bear a designed load without significant elongation and having bonded thereto a timing belt portion providing substantially spaced teeth for positive driving engagement with a toothed pulley, and a friction belt portion of V-shaped cross-section which is transversely notched inwardly to impart flexibility at longitudinally spaced zones and has substantially continuous frictional side engagement with the walls of a pulley in rounding the same, said strain member being located just a trifle outwardly of the dedendum line of said teeth and constituting a common tension transmitting member for the timing and V-shaped belt portions, said longitudinally spaced notched zones of said V-portion coinciding laterally with teeth of said timing belt portion and being constituted by V-shaped notches of substantially less width in the direction of the belt length than the spaces between said timing belt teeth, said notches having their apices adjacent said strain member.

2. A combined timing and V-type transmission belt, comprising an endless flexible strain member adapted to bear a designed load without significant elongation and having bonded to its opposite sides a timing belt portion of rectangular cross-section providing substantially spaced teeth for positive driving engagement with a toothed pulley, and a friction belt portion of truncated V-shaped transverse section and outwardly convergent in respect to the opposed sides thereof, said friction belt portion being transversely notched inwardly for increased flexibility at longitudinally spaced zones coinciding laterally with the teeth of said timing belt portion, but having substantially continuous frictional side engagement with a pulley in rounding the same, said strain member being located just a trifle outwardly of the dedendum line of said teeth and constituting a common tension transmitting member for the timing and V-shaped belt portions, the notching of said friction belt portion being provided by V-shaped notches of substantially less width in the direction of the belt length than the spaces between said timing belt teeth, which notches have their apices adjacent said strain member.

3. A transmission system including a plurality of toothed and smooth surfaced V-belt pulleys, and a transmission belt drivingly engaged with said pulleys, said belt having longitudinally spaced teeth formed on one surface portion thereof, which teeth are in positive driving engagement with at least one toothed pulley, a friction belt portion of truncated V-shaped cross section along the opposite surface portion thereof, the sides of which friction portion frictionally engage at least one V-belt pulley, and an endless strain resisting member bonded between said portions just a trifle outwardly of the dedendum line of said teeth, said member constituting a common tension transmitting member for said toothed and friction portions, said belt being transversely notched for flexibility at longitudinally spaced zones along said friction portion, but having substantially continuous frictional side engagement with said V-belt pulley in rounding the same, the notching of said friction belt portion being provided by V-shaped notches of substantially less width in the direction of the belt length than the spaces between said belt teeth, the apices of said notches being adjacent said strain member.

References Cited in the file of this patent

UNITED STATES PATENTS

| | | |
|---|---|---|
| 2,073,668 | Wilson | Mar. 16, 1937 |
| 2,296,740 | Reiling | Sept. 22, 1942 |
| 2,348,522 | Case | May 9, 1944 |
| 2,397,312 | Forrest | Mar. 26, 1946 |
| 2,507,852 | Case | May 16, 1950 |
| 2,514,429 | Waugh | July 11, 1950 |
| 2,548,135 | Worley | Apr. 10, 1951 |

FOREIGN PATENTS

| | | |
|---|---|---|
| 381,125 | Great Britain | Sept. 29, 1932 |